UNITED STATES PATENT OFFICE.

ALBRECHT SCHMIDT, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

VAT-DYE AND PROCESS OF MAKING SAME.

No. 868,295.

Specification of Letters Patent.

Patented Oct. 15, 1907.

Application filed January 22, 1907. Serial No. 353,527.

*To all whom it may concern:*

Be it known that I, ALBRECHT SCHMIDT, Ph. D., chemist, a citizen of the Empire of Germany, residing at Höchst-on-the-Main, Germany, have invented certain new and useful Improvements in the Process of Making Vat-Dyestuffs, of which the following is a specification.

I have found that phenylthioglycollic-ortho-carboxylic acid and its homologues and substitution products, when heated with bisulfites to about 150-190° C. under pressure, may be transformed into dyestuffs which on being treated with alkaline reducing agents, like hydrosulfites, become dissolved and dye in this vat cotton and wool.

Example I: 30 parts by weight of phenylthioglycollic-ortho-carboxylic acid are heated in a closed vessel to about 170-180° C. for 3 hours, preferably while stirring, with 300 parts by weight of commercial concentrated sodium bisulfite solution of about 40 per cent. strength. The product of reaction, consisting of a red crystalline mass, is boiled with carbon bisulfid and water and dilute soda-lye, whereupon the dyestuff remains behind as a loose, red, crystalline mass of silky aspect. The dyestuff is reduced with some difficulty in the vat, owing to its crystalline structure, but may be brought into a flaky form which is readily reduced, preferably by dissolution in cold sulfuric acid and precipitation by addition of water; it is identical with thio-indigo obtained by fusing phenylthioglycollic-ortho-carboxylic acid with caustic soda and subsequent oxidation; dyeing like thio-indigo cotton and wool in the vat.

Example II: 30 parts by weight of tolylthioglycollic-ortho-carboxylic acid $$(S-CH_2-COOH:CH_3:COOH = 1:4:6)$$

are heated to about 170-180° C. with about 180 parts by weight of a commercial sodium bisulfite solution until the transformation is complete. The dyestuff purified by boiling with soda-lye and crystallized from nitrobenzene dyes cotton, for instance, violet-red in the vat.

Example III: 30 parts by weight of tolylthioglycollic-ortho-carboxylic acid $$(S-CH_2-COOH:CH_3:COOH = 1:3:6)$$

are heated to 180° C. with 300 parts by weight of commercial concentrated sodium bisulfite solution. The dyestuff purified by boiling with soda-lye is a crystalline powder of brownish-red color; the new dyestuff product dyes in the vat an alizarin-like red of much yellower tint than that produced by thio-indigo.

Example IV: 30 parts by weight of chloro-phenyl-thioglycollic-ortho-carboxylic acid $$(S-CH_2-COOH:Cl:COOH = 1:3:6)$$

obtained from chloroanthranilic acid $$(NH_2:Cl:COOH = 1:3:6)$$

are heated with 160 parts by weight of a solution of bisulfite while stirring or in a shaking apparatus to 180° C. for 3 hours. The dyestuff obtained after boiling with soda-lye dyes in the vat cotton and wool with a still yellower and faster tint than that obtained with the dyestuff from phenylthioglycollic-ortho-carboxylic acid.

Other substitution products of the phenylthioglycollic-ortho-carboxylic acid behave similarly.

Having now described my invention, what I claim is:

1. The process herein described of making vat dyestuffs, which consists in heating under pressure arylthioglycollic-ortho-carboxylic acids with bisulfites.

2. As a new product, the dyestuff having the formula $C_{16}H_6O_2S_2(CH_3)_2=1:3$ from tolylthioglycollic-ortho-carboxylic acid $(S-CH_2-COOH:CH_3:COOH)=1:3:6$ being a red powder, soluble in concentrated sulfuric acid with a darkish yellow-green and in hot nitrobenzene with a violet-red color; showing on the porcelain a cherry-red metallic touch.

In testimony, that I claim the foregoing as my invention, I have signed my name in presence of two subscribing witnesses.

ALBRECHT SCHMIDT.

Witnesses:
JEAN GRUND,
CARL GRUND.